Dec. 16, 1969 R. J. LAHR 3,484,551

TRANSMISSION AND RECORDING SYSTEM

Filed Jan. 2, 1968

INVENTOR.
ROY J. LAHR
BY Ronald Zibelli
ATTORNEYS

United States Patent Office 3,484,551

Patented Dec. 16, 1969

3,484,551

TRANSMISSION AND RECORDING SYSTEM

Roy J. Lahr, Penfield, N.Y., assignor to Xerox Corporation, Rochester, N.Y., a corporation of New York Filed Jan. 2, 1968, Ser. No. 695,247

Int. Cl. H04l 15/00; G08b 23/00; G01d 9/04

U.S. Cl. 178—30 6 Claims

ABSTRACT OF THE DISCLOSURE

An alphanumeric data transmission and recording system wherein alphanumeric codes are decoded at the transmitting terminal into matrix pulse sequences representative of the alphanumeric character which are transmitted in parallel over a transmission link to recorders having a plurality of marking elements.

This invention relates generally to the transmission of alphanumeric data and the recording of this data by remote or satellite recorders.

In a situation where a plurality of satellite alphanumeric recorders, usually remote from an alphanumeric data source, are employed for recording information, prior art practice relies on the serial transmission of individual alphanumeric symbol *codes* to each recorder. The recorder generally includes a buffer to store transmitted codes and a decoder circuit to generate recording pulses in accordance with the particular character's matrix configuration represented by this transmitted code. These recording pulses are then utilized to initiate and control a particular recording process resulting in a visible recording of the information transmitted.

This prior art method, while operating in a successful manner under ideal conditions, has several defects which, if corrected, minimized, or eliminated, would generally enhance alphanumeric data transmission to and recording by remote recorder units and promote their commercial acceptance and application.

One major defect of the present prior art system is the expense necessitated at the recording terminals. Expensive decoding and buffer circuits are required and are duplicated at each terminal. In the application to mobile automobile units for, as an example, a taxicab fleet, the expense may be prohibitive. These circuits also require the same multiple of maintenance time and labor thus increasing the expense of such a system.

Another drawback to this prior art approach is the restriction of the system to a fixed matrix configuration in character generation and recording unless the decoder circuits are altered or replaced entirely. Obviously, the price for this flexibility in character style or form is high.

A still further disadvantage of the prior art technique is the degree of error in the final recording occasioned by transmission noise, interference, or other electrical disturbances. When a character code is distorted in transmission, the decoder circuit at the recording terminal may interpret the code to be that for another totally different character thereby resulting in the recording of an erroneous character. While the use of parity bits and other error correction schemes may reduce this possibility, their use reduces the overall economical attractiveness of such a system.

It is, therefore, an object of the present invention to improve the transmission and recording of alphanumeric data.

It is also an object of the present invention to provide an improved alphanumeric data transmitting and recording system wherein each satellite recorder is simplified in electrical components and therefore economically attractive.

Another oject of the present invention is to provide an improved alphanumeric data transmission and recording system which is marginally affected by electrical distortion of transmitted data.

A still further object of the present invention is to provide an improved high speed alphanumeric data transmission and recording system wherein the alphanumeric format may be altered simply and inexpensively.

These and other objects which may become apparent are accomplished in accordance with the principles of the present invention wherein alphanumeric codes are decoded at the transmitting terminal into matrix pulse sequences representative of the alphanumeric character which are transmitted in parallel over a transmission link to recorders having a marking element for each parallel transmission channel.

For a better understanding of the invention as well as other objects and features thereof reference may be made to the following description of the invention to be read in connection with the accompanying drawings wherein.

Figure 1:
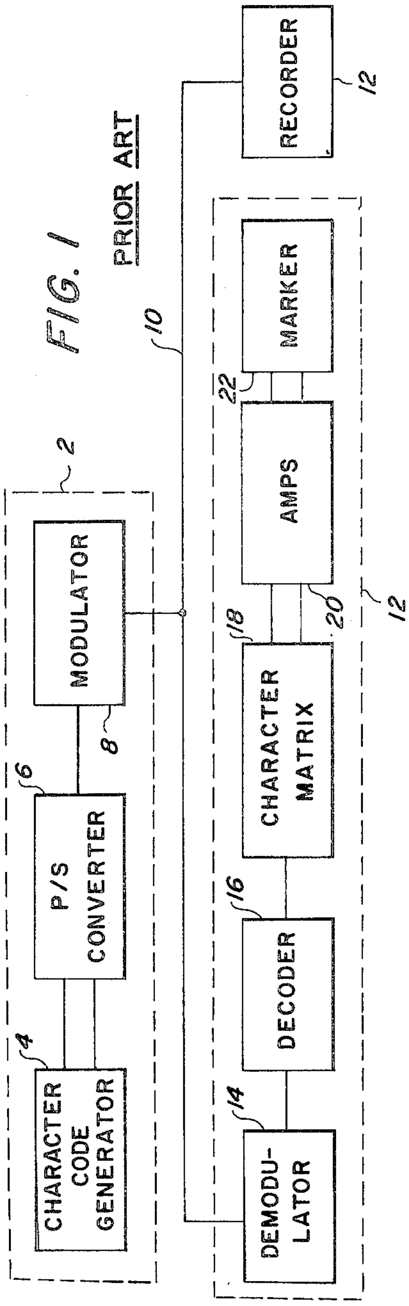
FIGURE 1 represents a typical prior art alphanumeric data transmission and recording system.

FIGURE 1 illustrates in block form a typical prior art alphanumeric data transmission and recording system. Such a system as shown generally includes at the transmitter terminal, designated generally within the broken line 2, a character code generator 4. This code generator may be a conventional keyboard which generates at parallel outputs a code representative of a particular character. Of course, other character code generators may be employed such as a digital computer, tape reader which reads code representations from a prepunched tape or other well-known character code generators. The character code so generated is supplied in parallel to a conventional parallel-to-serial converter 6 which transforms the usually parallel-received character code into a serial sequence of pulses still representative of the code for the particular character to be transmitted. This serial sequence of pulses may then be modulated in a well known manner by a modulator circuit 8 and transmitted via a suitable transmission link designated by reference numeral 10. This transmitted code is then received by a plurality of recorders each designated by reference numeral 12 in FIGURE 1.

A typical recorder is shown in this figure as comprising a suitable demodulator circuit 14 for reconstituting the original transmitted character code into its sequential pulse train which is then translated to a character code decoder 16 of conventional design. This decoder responds to the particular code pulse grouping supplied by the demodulator 14 and selects a particular character wire input associated with a standard character matrix 18. This character matrix may be a diode or magnetic core matrix, for example, and responds to the output from the decoder to generate selected parallel pulse trains. These pulse trains provide the inputs to suitable like number of amplifiers 20 which amplify and shape each pulse in the pulse train and relay them to a marker device 22. This device then generates a visible alphanumeric character represented by the transmitted code group. As noted previously, this alphanumeric character would generally be of an *m* by *n* matrix, for example, 5 x 7.

The marker device may be in the form of a linear array of styli which are moved in contacting relationship across the surface of a current sensitive recording medium which discolors when one of the contacting styli receives a record pulse. A typical marker assembly suitable in this application is disclosed in U.S. Patent 3,166,-

752, in the name of H. C. Waterman, which issued Jan. 19, 1965.

The above description of a typical prior art alphanumeric data transmission and recording system has been stated in relation to a transmission link which could very well be one which utilizes electromagnetic radiation energy, such as in the form of standard broadcast signals. However, it should be realized that the prior art system is equally adaptable to a transmission link of standard cable which would directly connect the transmitter with each individual recorder, such as a campus type network. The present invention is not limited by the transmission link selected and, therefore, for simplicity it will be described in connection with a direct wire network. In other words, a campus type system will be described wherein each recorder is connected via transmission lines or other hard conductor linkage with the transmitter.

Figure 2:
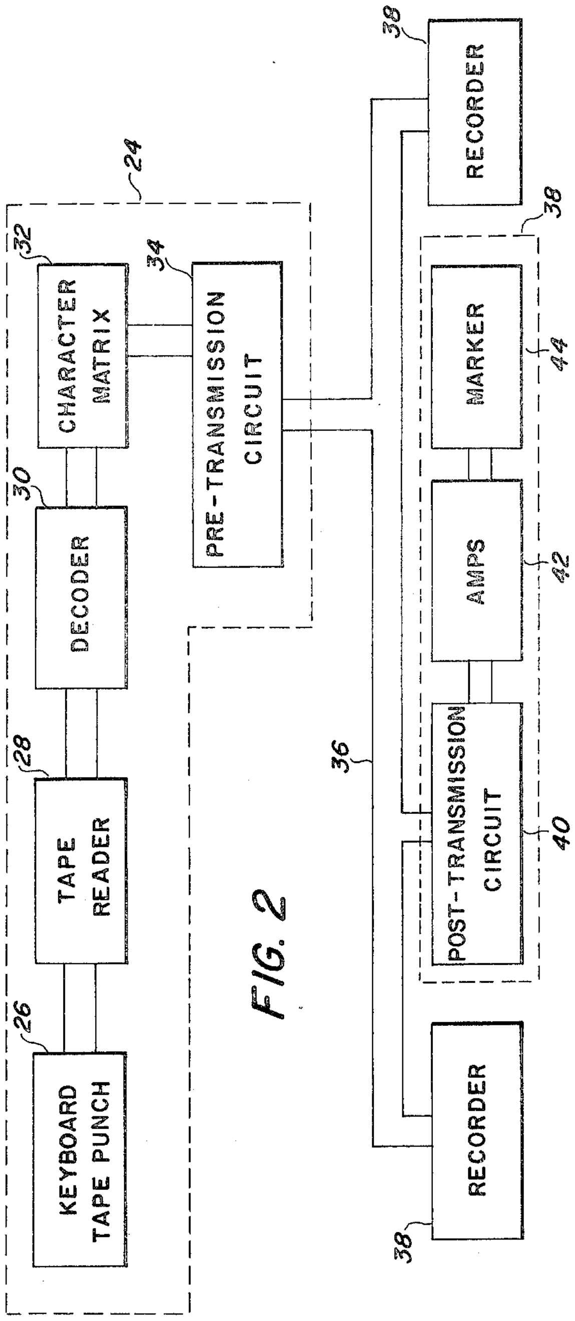
FIGURE 2 represents a block diagram of the present invention.

Therefore, referring to FIGURE 2 there is illustrated a block diagram of the present invention wherein a transmitter is enclosed in broken line 24. This transmitter may include a suitable character code generator which is shown as including a keyboard and tape punch apparatus 26 of conventional design which may generate the particular character codes on a punched tape in response to keyboard depressions. This permits storage of all transmitted information as well as providing an input to a conventional tape reader 28 which responds to the perforations in the tape to generate in parallel a group of pulses representative of the desired alphanumeric character to be transmitted.

A decoder 30 of conventional design deciphers the input character code to generate a character pulse at one of several outputs corresponding to a character input wire associated with the character matrix 32. Upon receipt of the character pulse, the character matrix 32 will generate at a plurality of parallel outputs a group of pulses indicative of the alphanumeric character to be transmitted and recorded. These parallel outputs provide inputs to a pre-transmission circuit 34 which conventionally may be of any design necessary to amplify and shape the received pulse trains so that they will be compatible with the transmission link 36. In the case of a direct parallel wire system, amplification and shaping are all the operations required by the pre-transmission circuit 34 to prepare the pulses generated by the character matrix 32 for transmission.

A plurality of recorders 38 are shown in FIGURE 2 as comprising a post-transmission circuit 40 which in the parallel straight wire transmission scheme may include additional amplification and shaping circuits to reconstitute the transmitted signals as needed to render them effective for the remaining circuits of the recorder itself. These processed signals may be additionally amplified by a plurality of parallel amplifiers 42, the outputs of which are connected in parallel to a marker device 44 which may be of the same design as the marker device 22 in FIGURE 1.

The keyboard and tape punch 26 and tape reader 28 correspond functionally with the character code generator 4 in FIGURE 1 while the decoder 30 and character matrix 32 are the functional counterpart in FIGURE 2 of the decoder 16 and character matrix 18 of FIGURE 1. However, as described above, the present invention as illustrated in FIGURE 2 utilizes decoder 30 and character matrix 32 in a generally single transmitting terminal while the prior art concept employs a decoder and character matrix in each recording terminal.

Therefore from the above description, the advantages of the present invention over the prior art alphanumeric data transmission and recording systems may be easily appreciated. The prior art concept requires a character code decoder and a character matrix in each receiver or recording terminal before that terminal can be responsive to the transmitted character codes corresponding to alphanumeric data to be recorded. The present invention stipulates only that the character code decoder and associated character matrix be present in the transmitting terminal while the multiple recording terminals remain electronically less complex and therefore less expensive.

While the particular marking technique utilized in the recording terminal, e.g. a seven styli array, limits in a particular aspect the form which the final alphanumeric recording may take, it is extremely difficult in the prior art system to alter the configuration of the subsequent recordings without replacing the character matrix in each recording terminal. On the other hand, in accordance with the present invention to change the form of the alphanumeric symbols recorded it is only necessary to replace or alter the character matrix at a single transmitting terminal which may be associated with a multiple of recording terminals.

Extraneous electrical noise can oftentimes distort a transmitted signal. In the case of the prior art transmission and recording system such a distortion may completely alter the transmitted character code to correspond with an undesired character. Without taking additional precaution, the recording terminal would decode this distorted character code and record the erroneous symbol. However, in the system of the present invention as illustrated in FIGURE 2 a distortion of the transmitted data at worst would result only in the omission of the portion of a recorded character or a random addition to this character. In any except very extreme conditions the transmitted character would be recognizable after the recording operation even in the presence of significant electrical distortion. This advantage may be of major concern to users in particular applications where accuracy of transmission and recording is important.

While a conventional parallel wire system has been referred to in the description of the present invention as the transmission link between the transmitting terminal and the recording terminals, it will be realized by those skilled in the art that the concepts embodied herein are equally applicable to transmission in the form of electromagnetic radiation energy. In such a system the pre-transmission circuit of FIGURE 2 may include conventional means for frequency modulating the various pulses generated at the parallel outputs of the character matrix 32 while the post-transmission circuit 40 would include appropriate demodulating circuits of conventional design and frequency selective filters to reconstitute the transmitted information into a form similar to that generated by the character matriz at the transmitting terminal.

Also, a current sensitive recording medium and compatible marking device have been referred to in the description; however, the invention is not limited to such a recording technique. Other techniques are also possible such as electrographic, photographic, or magnetic recording depending upon the needs of the application.

Also, while a keyboard and tape punch and reader have been used to describe the present invention, other sources of alphanumeric codes may be employed such as simple keyboards, magnetic tape, computers and the like.

What is claimed is:

1. An alphanumeric data transmission and recording system comprising:

(a) a source of pulse code groups representative of alphanumeric characters;

(b) decoder means for differentiating among said pulse code groups by selectively generating a character select signal;

(c) pulse generating means responsive to said character select signal and having a plurality of parallel outputs for generating concurrently at each of said outputs a continuous pulse train, each of the pulse trains so generated collectively being representative of a particular alphanumeric character, (d) a transmission medium;

(e) means for coupling said parallel outputs to said transmission medium;

(f) a plurality of recorders each including
  (1) means for coupling said transmission medium to a plurality of parallel output terminals; and
  (2) a recording means coupled to said parallel output terminals for producing visible marks indicative of pulses present at said parallel output terminals.

2. An alphanumeric data transmission and recording system comprising:
(a) a transmission medium;
(b) a transmitting terminal including
  (1) means for generating character code in the form of a pulse group, said group being representative of a particular alphanumeric character to be transmitted and recorded;
  (2) decoder means responsive to said pulse group for generating a character select pulse unique to one of a plurality of character select input terminals;
  (3) character matrix means coupled to said character select input terminals having a plurality of output terminals, and responsive to said character select pulse for generating a group of continuous pulse trains; and
  (4) means coupled between said output terminals and said transmission medium for providing electrical signals representative of said pulse trains to said transmission medium;
(c) a plurality of recording terminals each one of which includes
  (1) marker means for making visible marks in response to marking signals received thereby; and
  (2) means coupled between said transmission medium and said marker means for supplying marking signals to said marker means, said marking signals being a function of said electrical signals after said electrical signals have been transmitted by way of said transmission medium.

3. A system for the transmission and recording of alphanumeric characters wherein each recorded character is composed of visible portions of an *m* by *n* matrix, where *m* and *n* are integers, comprising:
(a) a transmission medium;
(b) a transmitting terminal including
  (1) means for selectively generating a code signal representative of a particular alphanumeric character output;
  (2) character matrix means having *n* output terminals responsive to said code signal for generating a plurality of continuous pulse trains, each one of said pulse trains being present at one of said output terminals, said pulses in a particular pulse train representing portions in said matrix;
  (3) means coupled between said character matrix means and said transmission medium for applying transmission signals to said transmission medium as a function of said pulse trains;
(c) a plurality of recording terminals each including recording means coupled to said transmission medium for making visible marks in an *m* by *n* matrix corresponding to said transmission signals.

4. A system as defined in claim 3 wherein said recording means includes
(a) a movable array of *n* conductive styli
(b) means coupled between said transmission medium to said styli for supplying marking pulses to said styli as a function of said transmission signals.

5. A system for the transmission and recording of alphanumeric characters wherein each recorded character is composed of visible portions of an *m* by *n* matrix, where *m* and *n* are integers, comprising:
(a) a transmission medium;
(b) a transmitting terminal including
  (1) character means for generating in parallel *n* continuous pulse trains representative of a particular character to be transmitted;
  (2) means coupled between said character means and said transmission medium for supplying thereto transmission signals representative of said pulse trains;
(c) a plurality of recording terminals, each one including
  (1) recording means responsive to recording pulse trains received thereby in parallel for making visible marks representative of a particular character; and
  (2) means coupled between said transmission medium and said recording means for supplying, after transmission over said transmission medium said transmission signals to said recording means in the form of recording pulse trains.

6. A system as defined in claim 5 wherein said recording means includes a movable array of *n* conductive styli.

References Cited

UNITED STATES PATENTS

| | | | |
|---|---|---|---|
| 3,359,366 | 12/1967 | Magleby | 178—30 |
| 3,393,300 | 7/1968 | Jennings et al. | 346—44 |

THOMAS A. ROBINSON, Primary Examiner

U.S. Cl. X.R.

340—324; 346—44